(12) United States Patent
Schwinbt

(10) Patent No.: US 7,207,631 B1
(45) Date of Patent: Apr. 24, 2007

(54) SIDE DISCHARGE BULK MATERIAL TRAILER

(76) Inventor: Randall M. Schwinbt, Aeroswint S. of Highway 4 P.O. Box 116, Utica, KS (US) 67584

( * ) Notice: Subject to any disclaimer, the term of this patent is extended or adjusted under 35 U.S.C. 154(b) by 434 days.

(21) Appl. No.: 10/776,804

(22) Filed: Feb. 11, 2004

Related U.S. Application Data

(60) Provisional application No. 60/446,690, filed on Feb. 11, 2003.

(51) Int. Cl.
*B60P 1/34* (2006.01)

(52) U.S. Cl. ................. 298/7; 298/18; 298/23 MD; 298/23 M

(58) Field of Classification Search ............... 298/7, 298/18, 23 MD, 23 M, 25; 414/519, 520; 105/255, 288; 296/14
See application file for complete search history.

(56) References Cited

U.S. PATENT DOCUMENTS

| | | | |
|---|---|---|---|
| 759,275 A | 5/1904 | Hart | |
| 1,067,074 A | 7/1913 | Strellner et al. | |
| 1,188,787 A * | 6/1916 | Hunt | |
| 1,892,698 A | 1/1933 | Fildes | |
| 1,926,439 A | 9/1933 | Fildes | |
| 2,739,836 A | 3/1956 | Kilpatrick | |
| 2,989,929 A | 6/1961 | Flowers | |
| 3,075,812 A | 1/1963 | Niece | |
| 3,257,145 A | 6/1966 | Case et al. | |
| 3,759,561 A | 9/1973 | Barnes et al. | |
| 4,106,812 A | 8/1978 | Clark | |
| 5,588,711 A * | 12/1996 | Hall | 298/18 |
| 5,749,630 A | 5/1998 | Ung | |
| 6,834,917 B2 * | 12/2004 | Hanna | 298/1 A |

* cited by examiner

*Primary Examiner*—Stephen Gordon
(74) *Attorney, Agent, or Firm*—Farris Law, P.C.

(57) ABSTRACT

The side discharge bulk material trailer includes a frame with two I-beam members. A plurality of A-frame members are attached to the I-beams. A fore and aft extending tube is attached to the apex of each A-frame. Floor plates are attached the upward facing surfaces of the legs of the A-frames. A front wall and a rear wall are attached to the frame. Upper doors and lower doors are provided in the side walls. The lower doors have a lower edge pivotally connected to the frame for pivotal movement about a horizontal axis. The upper doors have a top edge pivotally attached to the end walls for pivotal movement about a horizontal axis. Hydraulic cylinders pivot the doors to open and closed positions. Locks retain the lower doors in a closed position. The lower doors hold the upper doors closed.

2 Claims, 5 Drawing Sheets

SIDE DISCHARGE BULK MATERIAL TRAILER

The disclosure incorporates the side discharge bulk material trailer disclosed in provisional patent application No. 60/446,690 filed Feb. 11, 2003, whose priority is claimed for this application.

TECHNICAL FIELD

The bulk material trailer, for transporting material such as animal feed, has side discharge with gravity flow.

BACKGROUND OF THE INVENTION

Animal feed for animals such as cattle and other ruminants generally include-roughage and protein supplements. Most protein supplements are grain and grain products. The roughage includes grasses and coarsely chopped plant material. The chopped plant material is generally corn that has been harvested by a forage harvester. Plants other than corn are also chopped by forage harvesters. These other plants include milo, alfalfa and occasionally wheat. The plants are chopped before maturity and while they are still green and have a high moisture content. Due to the high moisture content, the chopped plant material is stored in a silo with reduced oxygen to prevent mold formation and spoilage.

The forage harvesters that are used today to remove essentially all the plant material above the ground, coarsely chop the plant material and blow the chopped material into a transport vehicle. Some forage harvesters are pulled by large farm tractors and driven by a power take-off on the tractor. Other forage harvesters are self-propelled. Self-propelled forage harvesters as well as large tractor towed forage harvesters are capable of harvesting and chopping tens of tons of crop material per hour. For such harvesters to be efficient, a forage transporter moves beside the forage harvester and catches the chopped plant material that is discharged from the harvester's discharge blower. The forage transporters, used in large scale forage harvesting operations, are trucks with forage boxes mounted on their frames or semi-trailers. The semi-trailers are capable of transporting 20–40 tons or more of forage depending upon their length. When one trailer is filled, an empty trailer should be ready to move into position to one side of the forage harvester and receive plant material from the forage harvester as the harvester moves forward through the field and harvests more plants.

End dump trailers, which are currently employed with forage harvesters to receive and transport chopped plant material, must be unloaded where the rear axles of the trailer are horizontal. The surface that supports the rear trailer wheels must also support the trailer without sinking into the ground. When the trailer is on a slopping surface and the axle is a little higher on one side than on the other, the trailer could fall over as the front of the loaded cargo box is raised. The trailer may also fall over as it is raised if the rear wheels on one side sink into the ground. The chopped plant material with a high moisture content does not flow evenly out the rear of a cargo box as the front of the box is raised. Uneven shifting of the material in a cargo box may shift the center of gravity and contribute to a trailer falling over on its side during unloading.

Truck drivers have been known to rush back to the field to be reloaded before an end dump cargo container is lowered to its normal transport position. In some cases the cargo container is only raised a few inches and no harm is done. In other cases the front of the cargo container contacts an obstruction such as a power line.

SUMMARY OF THE INVENTION

The semi-trailer has at least one rear axle attached to a frame by a suspension system and a king pin attached to the front of the frame and connectible to a fifth wheel hitch assembly. The frame includes a pair of spaced apart fore and aft beams that extend from the rear axle to a position near the king pin at the front of the trailer. A plurality of A-frame members have their horizontal cross bars supported by the two fore and aft beams. The apex of each of the A-frame members is in the lateral center of the trailer. The apexes are also at the same vertical height.

Left and right side metal plates are attached to the outer surfaces of the legs of the A-frame members to form a cargo container floor. Each metal plate extends from the front of the cargo container to the rear of the cargo container. A left side metal plate extends from the apex of each A-frame member to the left side of the trailer. A right side metal plate extends from the apex of each A-frame member to the right side of the trailer. Both metal plates extend upward and inward toward the apexes of the A-frames at an angle $\Theta$ of about 45°.

The cargo compartment is formed by a front end wall, a rear end wall, a left side wall and a right side wall. The forward end wall is secured to the front end of the floor and to the frame. The rear end wall is secured to the rear of the floor and to the frame. Both end walls are fixed relative to the frame. The side walls extend from the front end wall to the rear end wall.

The left side wall includes an upper door portion and a lower door portion. The upper door portion has an upper edge that is pivotally attached to the end walls for pivotal movement about a horizontal axis. The lower door portion has a lower edge that is pivotally attached to the end walls for pivotal movement about a horizontal axis that is below the left side of the floor. Hydraulic cylinders pivot the upper door portion between a closed generally vertical position and an open position extending laterally outward from the left side of the trailer. Hydraulic cylinders pivot the lower door portion between a generally vertical closed position and an open position in which it extends downward and outward from the bottom of the floor. The upper door portion is closed first. The lower door portion is closed last. The lower door portion is opened first and then the upper door portion is opened.

The right side wall includes an upper door portion and a lower door portion that are substantially identical to the left side wall. A cargo compartment extension can be added to the top of the end walls and to the top of the side walls to increase cargo capacity. The compartment extension sections above the left and right side walls extend upwardly from the upper door portions and are fixed to the front and rear extension sections.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
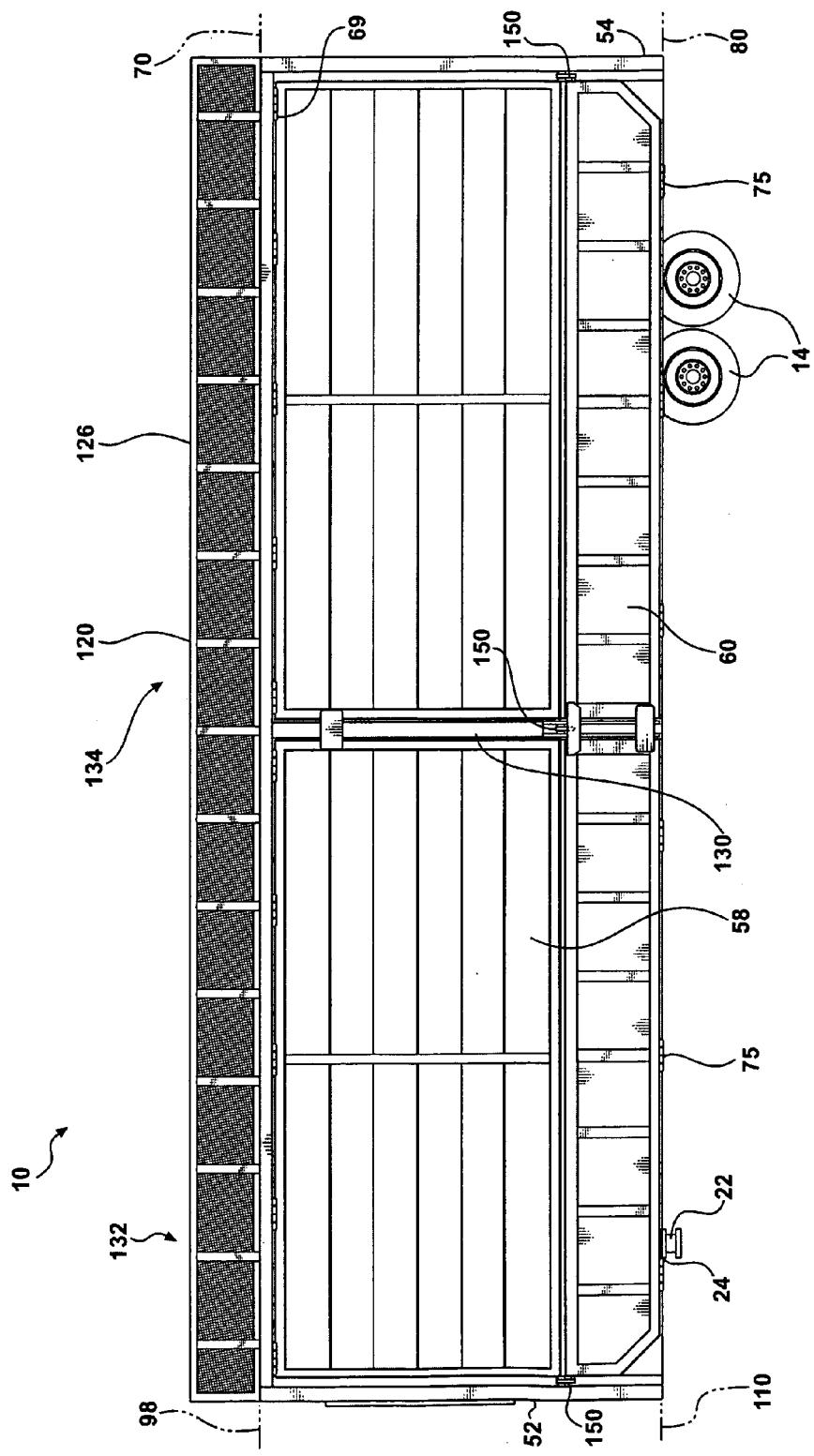
FIG. 1 is a side elevational view of the trailer.

The side discharge bulk material trailer 10 has a frame 12. The rear of the trailer 10 is supported by tires and wheels 14 journaled on axles 16. The axles are connected to a pair of spaced apart parallel I beams 18 and 20. A king pin 22 and king pin plate 24 for attaching the trailer to the fifth wheel on a tractor T, are attached to a forward end of the I beams 18 and 20. A-frame cross members 26 include a left leg 28, a right leg 30, and a cross bar 32. The legs 28 and 30 are rectangular tubes. The cross bar 32 is also a rectangular tube. The upper ends of the legs 28 and 30 are attached to a fore and aft extending horizontal tube 34. The tube 34 is parallel to the I-beams 18 and 20. Both legs 28 and 30 extend upward and inward from their lower ends at an angle $\Theta$ of 45°. If the bulk material that is to be transported is dry and flows easy, the angle $\Theta$ can be reduced and the tube 34 that forms the apex of the A-frame cross members 26 can be lowered. If the bulk material is sticky and does not flow well, the angle $\Theta$ can be increased and the tube 34 that forms the apex of the A-frame 26 can be raised. The bottom side surfaces 38 and 40 are about 96 inches apart. These side surfaces are on angle members that extend the length of the trailer 10. The A-frame cross members 26 are spaced apart a selected distance along the length of the I beams 18 and 20. The tubes 28, 30, 32 and 34 are preferably welded together. The tubes 32 can also be welded to the I beams 18 and 20.

Trailer floor plates 42 and 44 are attached to the top of the legs 28 and 30. Each floor plate extends substantially the length of the cargo compartment. The left floor plate 42 extends from the side surface 38 up toward the horizontal tube 34. The right floor plate 44 extends from the side surface 40 up toward the horizontal tube 34. The floor plate 42 and 44 can be joined to each other above the horizontal tube 34.

Figure 2:
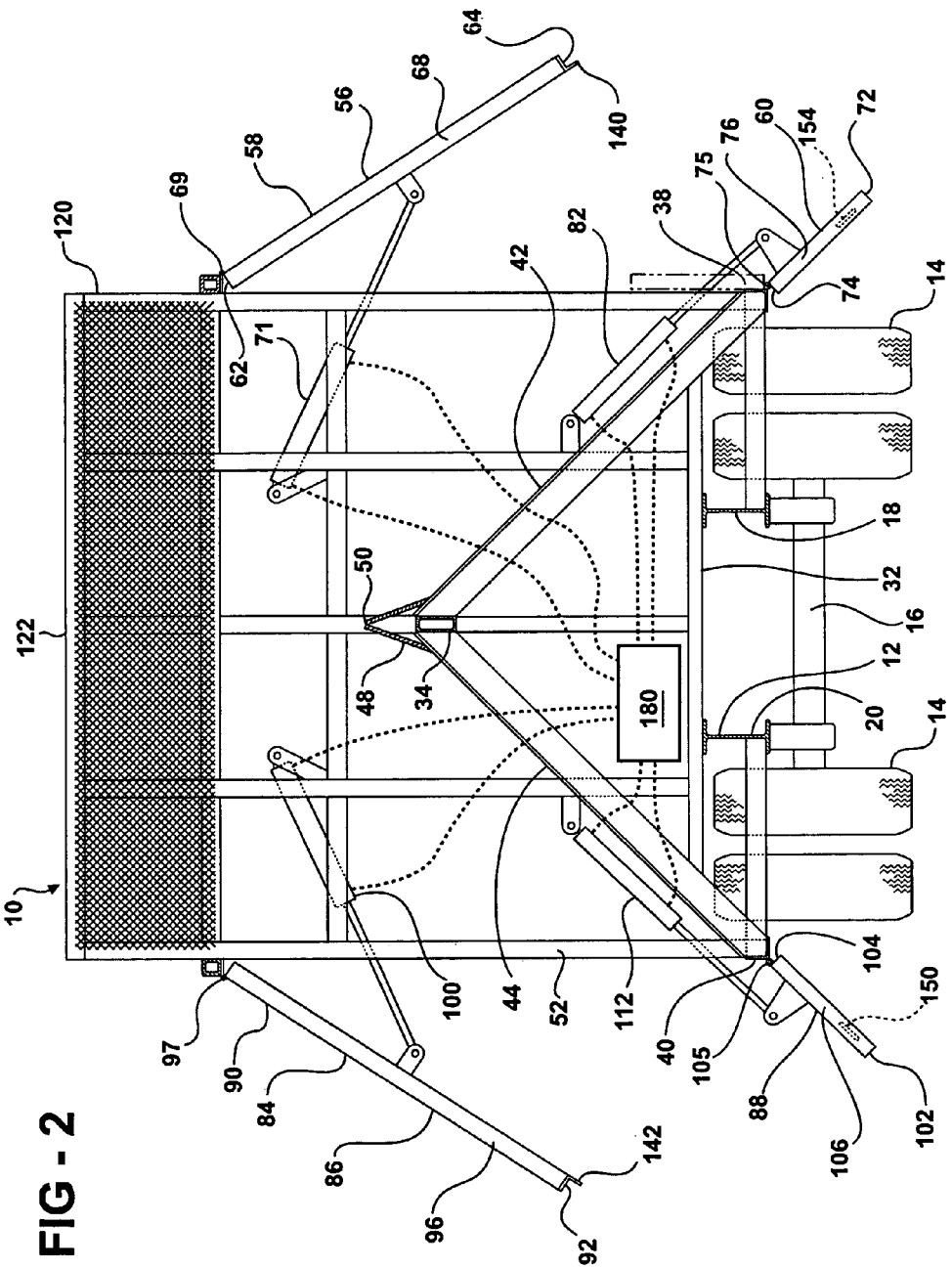
FIG. 2 is a front end elevational view of the trailer with parts broken away to show the A-frame cross members.

A cap 48, as shown in FIG. 2, can be attached to the upper edge of the floor plates 42 and 44 and extends up above the tube 34 to an apex 50. The sides of the cap 48 are closer to vertical than the floor plates 42 and 44 and the apex 50 is more pointed than the apex formed by the tube 34 of the A-frame 26. Cargo such as forage is less likely to catch on the apex 50.

The front end wall 52 is attached to the frame 12, to floor plates 42 and 44 and to the cap 48. A rear end wall 54 is also attached to the frame 12, the floor plates 42 and 44 and to the cap 48.

The left side wall 56 includes an upper door 58 and a lower door 60. The upper door 58 has a top edge 62, a bottom edge 64, a rear edge 66 and a front edge 68. The top edge 62 is pivotally attached to the front end wall 52 and the rear end wall 54 by hinges 69 for pivotal movement about a horizontal fore and aft axis 70. Hydraulic cylinder 71 are provided to open and close the left upper door 58.

The left lower door 60 has a top edge 72, a bottom edge 74, a front edge 76, and a rear edge 78. The bottom edge 74 is pivotally attached to the frame 12, the front end wall 52 and the rear end wall 54 by hinges 75 for pivotal movement about a horizontal fore and aft axis 80. Hydraulic cylinders 82 open and close the left lower door 60.

The right side wall 84 includes an upper door 86 and a lower door 88. The upper door 86 has a top edge 90, a bottom edge 92, a rear edge 94 and a front edge 96. The top edge 90 is pivotally attached to the front end wall 52 and the rear end wall 54 by hinges 97 for pivotal movement about a horizontal fore and aft axis 98. Hydraulic cylinders 100 are provided to open and close the right upper door 86.

The right lower door 88 has a top edge 102, a bottom edge 104, a front edge 106 and a rear edge 108. The bottom edge 104 is pivotally attached to the frame 12, the front end wall 52 and the rear end wall 54 by hinges 105 for pivotal movement about a horizontal fore and aft axis 110. Hydraulic cylinders 112 open and close the right lower door 88.

A cargo capacity extension 120 is mounted on top of the end walls 52 and 54. The extension includes a front wall 122, a rear wall 124, a left side wall 126, and a right side wall 128. The extension is made from expanded metal on a frame work to retain coarse ground plant material. Both side walls 126 and 128 are above the upper doors 58 and 86 and remain stationary when the upper doors are opened or closed.

A divider wall 130 divides the cargo area into a front compartment 132 and a rear compartment 134 on long trailers 10. The divider wall 130 is not employed with relatively short trailers or with bulk material boxes mounted on a truck frame. The divider wall 130 supports a third hydraulic cylinder 71 for opening and closing the left upper door 58. A third hydraulic cylinder 100 is also mounted on the divider wall 130 for opening and closing the right upper door 86. A third hydraulic cylinder 82 is connected to a divider wall 130 for opening and closed the left lower door 60. The right lower door 88 is opened and closed by three hydraulic cylinders 112, one of which is attached to the divider wall 130. Three hydraulic cylinders are used to close and open each of the two top side doors 58 and 86 each of the lower side doors 60 and 88.

A flange 140 extends downward from the bottom edge 64 of the left upper door 58. A flange 142 extends downward from the bottom edge 92 of the right upper door 86. These flanges 140 and 142 extend substantially the length of the trailer 10 and into the path of movement of the adjacent lower door 60 or 88. As a result, the upper doors 58 and 86 are to be closed before the adjacent lower door 60 or 88 is closed. The left lower door 60 contacts the flange 140 on the left upper door 58 when both left doors are closed. The right lower door 88 contacts the flange 142 on the right upper door 86 when both right doors are closed. The flanges 140 and 142 close the space between the upper and lower doors and accommodate some vertical movement of the lower doors relative to the upper doors due to flexing of the I-beams 18 and 20 when the trailer 10 is loaded.

Figure 3:
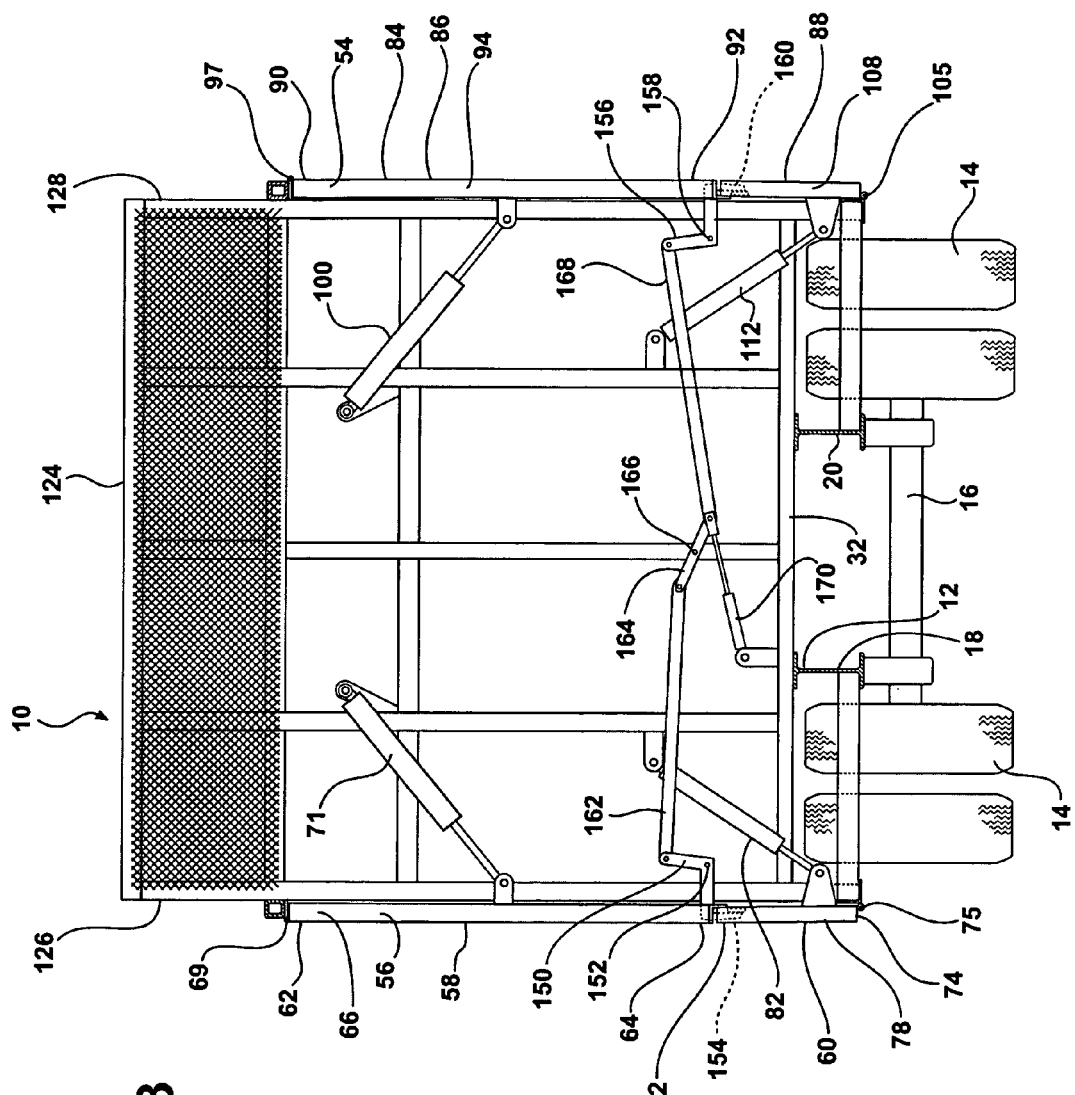
FIG. 3 is a rear end view of the frame and an end wall.
Figure 4:
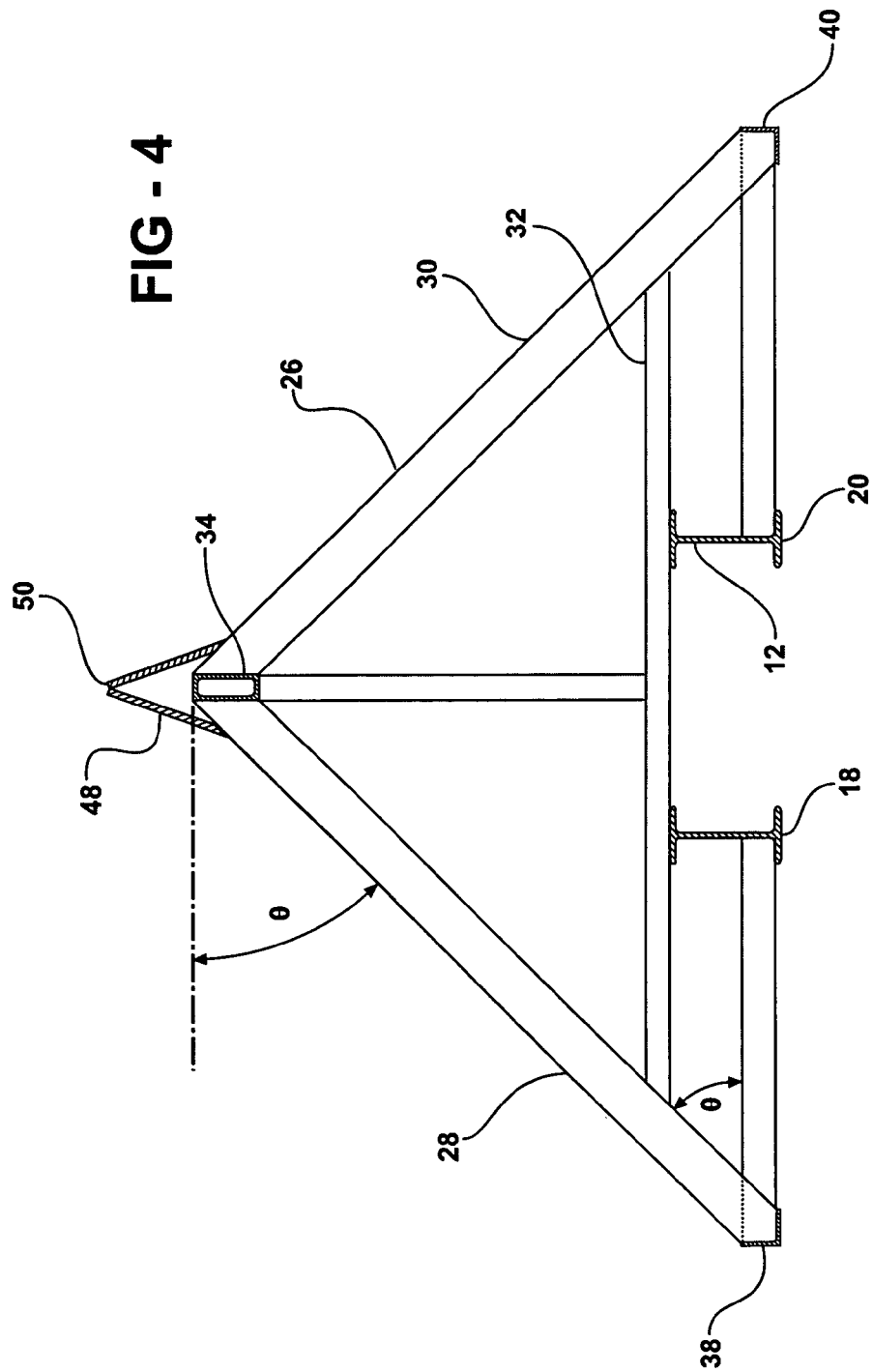
FIG. 4 is an end view of the frame and an A-frame cross member.
Figure 5:
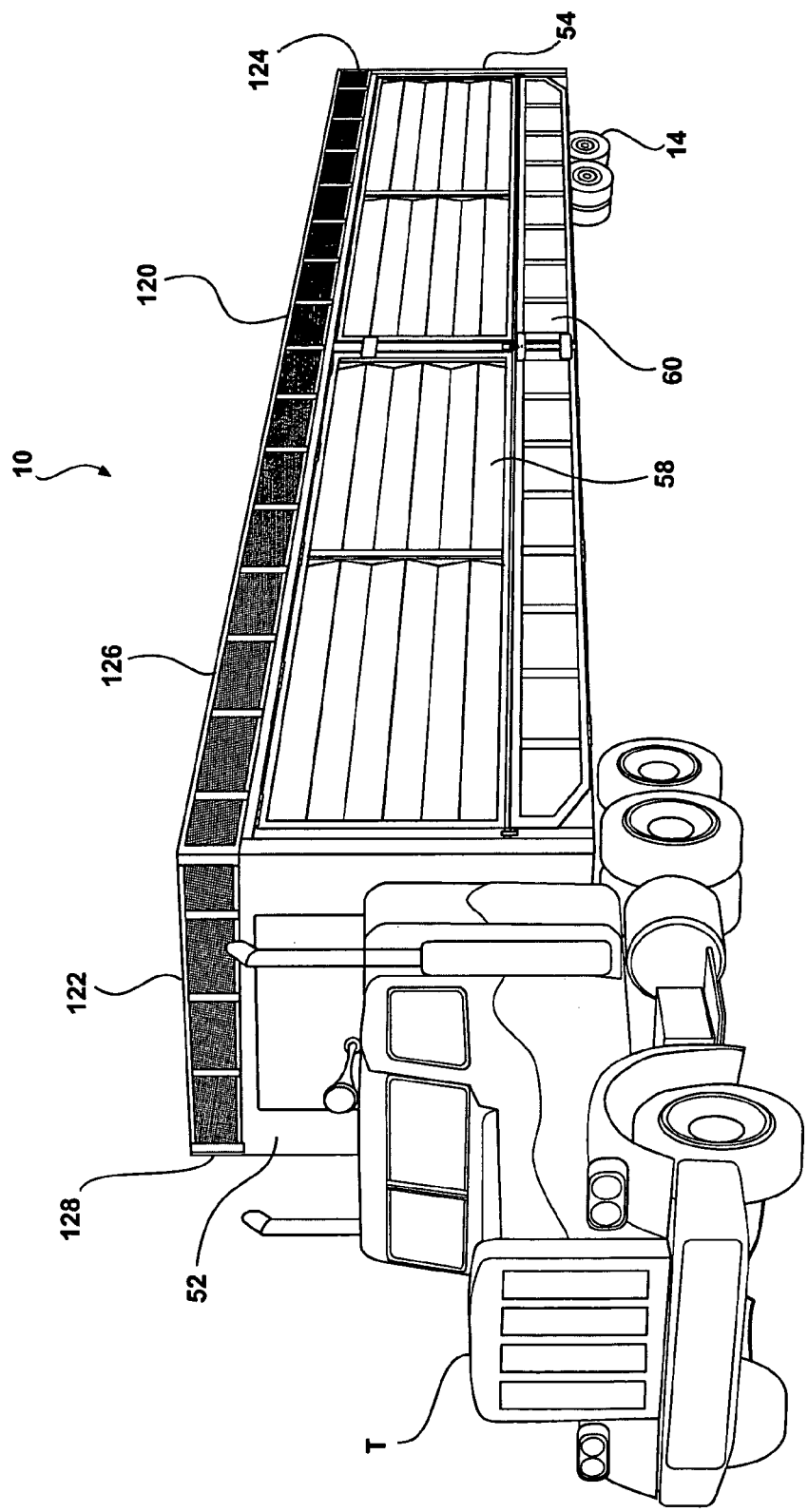
FIG. 5 is a perspective view of the trailer, with the doors closed, attached to a tractor.

The hydraulic cylinders 82 and 112 that open and close the lower doors 60 and 88 can be hydraulically locked in a closed position to hold the adjacent upper doors 58 and 86 in closed positions. However, leaks can occur in hydraulic systems. It is therefore desirable to provide a separate latching system as shown in FIG. 3. The latching system includes a left latch bar 150 pivoted on a pivot shaft 152 mounted on the trailer frame 12. Rotation of the left latch bar 150 in a counter clockwise direction about the shaft 152, as shown in FIG. 3, moves the left latch bar into engagement with a door latch member 154 fixed to the left lower door 60 and locks the left doors 60 and 58 in closed positions. Rotation of the left latch bar 150 in a clockwise direction about the shaft 152 releases the left doors 60 and 58 to be opened. The latching system also includes a right latch bar 156 pivoted on a pivot shaft 158 mounted on the trailer frame 12. Rotation of the right latch bar 156 in a clockwise direction about the shaft 158, as shown in FIG. 3, moves the right latch bar into engagement with a door latch member 160 fixed to the right lower door 88 and locks the right upper door 86 and right lower door in closed positions. Rotation of the right latch bar 156 in a counter clockwise direction about the shaft 158 releases the right doors 86 and 88 to be opened. The latch bar 150 is pivotally attached to a link 162. The link 162 is pivotally attached to a bell crank 164. The bell crank 164 is pivotally attached to the frame 12 by a pivot pin 166. A link 168 is pivotally attached to the bell crank 164 and to the right latch bar 156. A fluid operated cylinder 170 is connected to the frame 12 and to the bell crank 164. Extension of the cylinder 170, as shown in FIG. 3, pivots the latch bar 150 and the latch bar 156 toward latched positions. Retraction of the cylinder 170 pivots the latch bar 150 and the latch bar 156 toward unlatched positions. The latch system described above is preferably provided adjacent the end walls 52 and 54 as well as the divider wall 130 that support door opening cylinders 71, 82, 100 and 112. The cylinder 170 is preferably on air actuated cylinder.

The hydraulic cylinders 71, 82, 100 and 112 for opening and closing the doors 58, 60, 86 and 88 are double acting cylinders. A hydraulic control system 180 with a fluid reservoir, a motor driven pump and control valves is connected to the hydraulic cylinder 71, 82, 100 and 112 as shown in FIG. 2. Portions of the hydraulic control system can be mounted on the tractor T.

It is understood that the disclosed embodiment is representative of a presently preferred form of the invention and that others that accomplish the same function are incorporated herein within the scope of any ultimately allowed patent claims.

I claim:

1. A side discharge bulk material transport container comprising:
    a frame including a pair of spaced apart fore and aft extending beams, a plurality of A-frame members attached to the pair of spaced apart fore and aft extending beams, a left floor plate connected to the plurality of A-frame members, a right floor plate connected to the plurality of A-frame members and cooperating with the left floor plate to form an apex that is above and parallel to the pair of spaced apart fore and aft extending beams, and wherein the left floor plate extends downwardly and outward from the apex to a left bottom side and the right floor plate extends downwardly and outward from the apex to a right bottom side;
    a front end wall connected to the frame, the left floor plate and the right floor plate;
    a rear end wall connected to the frame, the left floor plate and the right floor plate;
    a left side wall including a left upper door extending from the front end wall to the rear end wall, a left upper door bottom edge, a left upper door top edge pivotally attached to the front end wall and the rear end wall for pivotal movement between a generally vertical left upper door closed position and a left upper door open position in which the left upper door extends downward and laterally outward from the left upper door top edge, a left lower door extending from the front end wall to the rear end wall, a left lower door top edge, a left lower door bottom edge pivotally attached to the left bottom side for pivotal movement between a generally vertical left lower door closed position and a left lower door open position in which the left lower door extends downward and laterally outward from the left lower door bottom edge;
    a right side wall including a right upper door extending from the front end wall to the rear end wall, a right upper door bottom edge, a right upper door top edge pivotally attached to the front end wall and the rear end wall for pivotal movement between a generally vertical right upper door closed position and a right upper door open position in which the right upper door extends downward and laterally outward from the right upper door top edge, a right lower door extending from the front end wall to the rear end wall, a right lower door top edge, a right lower door bottom edge pivotally attached to the right bottom side for pivotal movement between a generally vertical right lower door closed position and a right lower door open position in which the right lower door extends downward and laterally outward from the right lower door bottom edge;
    a left side upper hydraulic cylinder connected to the frame and to the left upper door for pivoting the left upper door between the left upper door generally vertical left upper door closed position and the left upper door open position;
    a left side lower hydraulic cylinder connected to the frame and to the left lower door for pivoting the left lower door between the generally vertical left lower door closed position and the left lower door open position;
    a right side upper hydraulic cylinder connected to the frame and to the right upper door for pivoting the right upper door between the generally vertical right upper door closed position and the right upper door open position;
    a right side lower hydraulic cylinder connected to the frame and to the right lower door for pivoting the right lower door between the generally vertical right lower door closed position and the right lower door open position.

2. A cargo container comprising;
    a frame;
    a front end wall connected to the frame;
    a rear end wall connected to the frame;
    a left side wall including a left upper door extending from the front end wall to the rear end wall and including a left upper door top edge pivotally attached to the front end wall and the rear end wall for pivotal movement about a left upper horizontal axis, a left lower door extending from the front end wall to the rear end wall and including a left lower door bottom edge pivotally attached to the frame for pivotal movement about a left lower horizontal axis;
    a right side wall including a right upper door extending from the front end wall to the rear end wall and including a right upper door top edge pivotally attached to the front the front end wall and the rear end wall for pivotal movement about a right upper horizontal axis, a right lower door extending from the front end wall to the rear end wall and including a right lower door bottom edge pivotally attached to the frame for pivotal movement about a right lower horizontal axis;
    a cargo container floor including a floor apex extending from the front end wall to the rear end wall and parallel to the left upper horizontal axis;
    a left floor plate extend from the front end wall to the rear end wall and from the floor apex downward and outward to the left side wall;
    a right floor plate extending from the front end wall to the rear end wall and from the floor apex downward and outward toward to the right side wall;
    an upper left hydraulic cylinder connected to the front end wall and the left upper door;

a lower left hydraulic cylinder connected to the front end wall and the left upper door;

an upper right hydraulic cylinder connected to the front end wall and the right upper door;

a lower right hydraulic cylinder connected to the front end wall and the right lower door; and a hydraulic control system for selectively supplying hydraulic fluid to the upper left hydraulic cylinder, the lower left hydraulic cylinder, the upper right hydraulic cylinder, and the lower right hydraulic cylinder.

\* \* \* \* \*